(No Model.)
W. T. LEVI.
GLASS TUBE CUTTER.
No. 457,732. Patented Aug. 11, 1891.
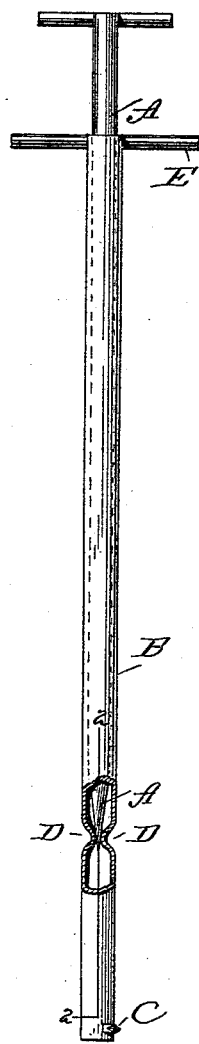
Attest
Walter Donaldson
F. L. Middleton
Inventor
William T. Levi
by Ellis Spear
Atty.

UNITED STATES PATENT OFFICE.

WILLIAM T. LEVI, OF CHARLESTON, WEST VIRGINIA.

GLASS-TUBE CUTTER.

SPECIFICATION forming part of Letters Patent No. 457,732, dated August 11, 1891.

Application filed April 23, 1891. Serial No. 390,115. (No model.)

*To all whom it may concern:*

Be it known that I, WILLIAM T. LEVI, a citizen of the United States of America, residing at Charleston, in the county of Kanawha and State of West Virginia, have invented certain new and useful Improvements in Glass-Tube Cutters, of which the following is a specification.

The object of my invention is to provide a simple form of cutter for glass tubes.

It consists of a tubular body portion adapted for insertion into the tube to be cut, this tube carrying the cutting-point and having an operating-rod within the tube, said rod projecting at one end, so as to be in position to be manipulated.

In the accompanying drawing is represented a side elevation of the cutter, partly broken away.

The body portion B is in the form of a tube of smaller diameter than the tube to be cut, so as to adapt it to be placed within the same. Carried upon its lower end is a diamond or cutting-point C, projecting from the periphery of the tube, so as to come in contact with the inner wall of the tube to be cut. The tube B has its lower end split on the lines 2 2, and each of the split portions is provided with a depression or indentation opposite each other, as shown at D. The upper end of the tube B is provided with a cross-piece E, which may rest upon the end of the tube to be cut, and thus support the tube B within the same.

In order to press the cutting-point against the inside wall of the tube to be cut, I provide a rod A, fitting within the tube and having a pointed end, which is adapted to engage the depressions D, and when pressure is applied to the handle of the rod A the split portions of the tube are forced apart, which thus brings the cutting-point in contact with the wall of the tube, and while the point is held in this position the cross-bar E, connected to the tube B, is turned, thus marking the tube to be cut so deeply by the action of the cutting-edge as to permit of its being split or broken by a slight touch.

I claim as my invention—

1. A tube-cutter consisting of a tubular body portion carrying a cutting-point, said body portion having a split lower portion and means for forcing the split ends apart, substantially as described.

2. A tube-cutter consisting of a tubular body portion having a split lower end, a cutting-point carried thereby, indentations or depressions in said split portions, and an operating-rod having a pointed lower end adapted to enter the tubular portion and separate the split parts thereof, substantially as described.

In testimony whereof I affix my signature in presence of two witnesses.

WILLIAM T. LEVI.

Witnesses:
J. A. DE GRUYTER,
STEPHEN SHANNON.